United States Patent
Ko

(10) Patent No.: US 6,794,216 B2
(45) Date of Patent: Sep. 21, 2004

(54) CHOLESTERIC LIQUID CRYSTAL COLOR FILTER SUBSTRATE AND METHOD FOR FABRICATING THE SAME

(75) Inventor: Byung-Soo Ko, Gyeonggi-do (KR)

(73) Assignee: LG.Philips LCD Co., Ltd., Seoul (KR)

( * ) Notice: Subject to any disclaimer, the term of this patent is extended or adjusted under 35 U.S.C. 154(b) by 449 days.

(21) Appl. No.: 10/026,475

(22) Filed: Dec. 27, 2001

(65) Prior Publication Data

US 2002/0085147 A1 Jul. 4, 2002

(30) Foreign Application Priority Data

Dec. 28, 2000 (KR) .......................................... 2000-84223

(51) Int. Cl.[7] .......................... H01L 21/00; G02F 1/1335
(52) U.S. Cl. .......................... 438/72; 438/70; 349/115; 257/437
(58) Field of Search .......................... 349/96–115, 24, 349/32, 84, 37; 438/70, 72, 73, 74, 82; 257/435, 437

(56) References Cited

U.S. PATENT DOCUMENTS

| | | | | |
|---|---|---|---|---|
| 4,073,571 A | * | 2/1978 | Grinberg et al. ............ | 349/194 |
| 4,610,507 A | * | 9/1986 | Kamamori et al. ........... | 349/80 |
| 5,798,147 A | * | 8/1998 | Beck et al. .................. | 427/511 |
| 5,822,029 A | * | 10/1998 | Davis et al. ................. | 349/115 |
| 6,310,665 B1 | * | 10/2001 | Kido ........................... | 349/32 |
| 6,338,807 B1 | * | 1/2002 | Faris ...................... | 252/299.01 |
| 6,545,653 B1 | * | 4/2003 | Takahara et al. .............. | 345/87 |
| 6,573,961 B2 | * | 6/2003 | Jiang et al. .................. | 349/115 |
| 6,606,137 B2 | * | 8/2003 | Lee ............................. | 349/106 |

* cited by examiner

Primary Examiner—Jack Chen
Assistant Examiner—William C. Vesperman
(74) Attorney, Agent, or Firm—McKenna Long & Aldridge LLP

(57) ABSTRACT

A cholesteric liquid crystal (CLC) color filter substrate for reflective liquid crystal display devices comprises an alignment layer on a black substrate, a cholesteric liquid crystal (CLC) color filter on the alignment layer, the cholesteric liquid crystal (CLC) color filter including sub-color-filters red (R), green (G), and blue (B), and black matrices on boundaries of each of the sub-color filters R, G, and B. In addition, a cholesteric liquid crystal (CLC) color filter substrate for a reflective liquid crystal display devices comprises an alignment layer on a black substrate, a cholesteric liquid crystal (CLC) color filter on the alignment layer, the cholesteric liquid crystal (CLC) color filter including sub-color-filters R, G, and B, and boundaries of each of the sub-color filters R, G and B that reflect incident light having a long wavelength.

12 Claims, 4 Drawing Sheets

CHOLESTERIC LIQUID CRYSTAL COLOR FILTER SUBSTRATE AND METHOD FOR FABRICATING THE SAME

This application claims the benefit of Korean Patent Application No. 2000-84223, filed on Dec. 28, 2000 in Korea, which is hereby incorporated by reference as if fully set forth herein.

BACKGROUND OF THE INVENTION

1. Field of the Invention

The present invention relates to a liquid crystal display (LCD) device and more particularly to a cholesteric liquid crystal (CLC) display device.

2. Discussion of the Related Art

Generally, liquid crystal display devices can be classified as either a transmissive liquid crystal display device or a reflective liquid crystal display device. In the transmissive liquid crystal display device, either black or white is displayed by irradiating light from a light source disposed behind a liquid crystal panel to a liquid crystal layer and thus absorbing or transmitting the light depending on an alignment of liquid crystal molecules. Whereas the transmissive liquid crystal display devices require high power consumption because they use an artificial light source behind the liquid crystal panel, the reflective liquid crystal display devices depend on ambient light or an external artificial light source for their light source. Accordingly, the reflective liquid crystal display devices require lower power consumption as compared to the transmissive liquid crystal display devices. Therefore, the need for reflective liquid crystal display devices has been acknowledged.

In reflective liquid crystal display devices, incident light first passes through the liquid crystal panel, then is reflected in the liquid crystal panel, and finally the reflected light passes through the color filter to display a color image. As a result, the utilization ratio of the light is poor in these devices. In addition, the devices require a color filter that has sub-color filters arranged in a regularly repeated order of red (R), green (G), and blue (B). The sub-color-filters red (R), green (G), and blue (B) can be made through processes such as a pigment coating process, a light exposing process, and a patterning process. The manufacturing process for making these color filters is complex and therefore the costs of the color filters is high.

Therefore, a cholesteric liquid crystal (CLC) color filter that uses a cholesteric liquid crystal (CLC) as a color filter has been suggested to overcome the deficiencies described above. The cholesteric liquid crystal (CLC) has a layered structure. The liquid crystal molecules in every layer have similar properties to that of nematic liquid crystals. The alignment of the liquid crystal molecules of each layer can rotate in clockwise or counter clockwise directions enabling a difference in reflectance between the layers. Accordingly, a color can be displayed by the reflection and interference of light that is caused by the difference of the reflectance between layers. The rotations of the cholesteric liquid crystal (CLC) molecules form a helical structure.

A cholesteric liquid crystal (CLC) having a right-handed helical structure reflects a right circular polarization component and transmits a left circular polarization component of the incident light. The incident light consists of right circular polarization and the left circular polarization. If a cholesteric liquid crystal (CLC) has a left-handed helical structure, the cholesteric liquid crystal (CLC) reflects the left circular polarization component and transmits the right circular polarization component of the incident light.

The pitch is an important characteristic in the helical structure of the cholesteric liquid crystal (CLC). The pitch can be understood as a distance between the first cholesteric liquid crystal (CLC) layer and the last cholesteric liquid crystal (CLC) layer when the cholesteric liquid crystal (CLC) molecules in the first cholesteric liquid crystal (CLC) layer rotate 360 degrees. The pitch is a parameter that controls a hue of the cholesteric liquid crystal (CLC). For example, if the pitch is the same with a wavelength of red color (650 nm) then the cholesteric liquid crystal (CLC) reflects the red color observed in a front direction. The pitch of the helical structure of the cholesteric liquid crystal (CLC) can be controlled to selectively reflect or transmit the incident light with a wavelength in a particular range.

The cholesteric liquid crystal (CLC) color filter using the cholesteric liquid crystal (CLC) may be formed by mixing the cholesteric liquid crystal (CLC) with a photo-alignment polymer. Then the mixed solution of the cholesteric liquid crystal (CLC) and the photo-alignment polymer is heated to control the pitch and thereby the cholesteric liquid crystal (CLC) may reflect only the light in a particular wavelength range. The mixed solution of the cholesteric liquid crystal (CLC) is subsequently exposed to ultraviolet light to fix the photo related characteristics of the cholesteric liquid crystal (CLC).

FIG. 1 is a cross-sectional view of a conventional cholesteric liquid crystal (CLC) color filter substrate. As shown in this figure an absorption layer 34 is formed on a substrate 32 to manufacture a cholesteric liquid crystal (CLC) color filter substrate 30. An alignment layer 36 is then formed on the absorption layer 34. A cholesteric liquid crystal (CLC) color filter 38 is subsequently formed on the alignment layer 36. The cholesteric liquid crystal (CLC) color filter 38 includes sub-color filters red (R) 38a, green (G) 38b, and blue (B) 38c. The sub-color filters 38a, 38b and 38c are formed by controlling the pitch of CLC helix to reflect an incident light having a wavelength in a range corresponding to the desired displaying color of each of the sub-color filters red (R) 38a, green (G) 38b, and blue (B) 38c.

FIGS. 2A and 2B are cross-sectional views illustrating a fabrication process of the cholesteric liquid crystal (CLC) color filter according to the related art. As shown in these figures an absorption layer 34 is formed on a substrate 32 by forming a black resin. An alignment layer 36 is then formed on the absorption layer 34. A cholesteric liquid crystal (CLC) layer 37 is subsequently formed on the alignment layer 36. The cholesteric liquid crystal (CLC) layer 37 is a mixture of the cholesteric liquid crystal (CLC) and a photo-alignment polymer. A plurality of regions are defined in the cholesteric liquid crystal (CLC) layer 37 and each of these regions will become a sub-color-filters red (R), green (G), and blue (B) by controlling the pitch of CLC helix to reflect the incident light having a wavelength in a range corresponding to a desired displaying color of each of the sub-color-filters R 38a, G 38b, and B 38c.

The pitch of the CLC helix can be controlled in two ways. First, the pitch of the CLC helix can be controlled by varying the temperature, and then exposing the region for sub-color filter R in the cholesteric liquid crystal (CLC) layer 37 to ultraviolet rays using a mask 40 to fix the controlled pitch. Second, the pitch of the CLC helix can be controlled by irradiating ultraviolet rays that have a first wavelength range and then fixing the controlled pitch by irradiating ultraviolet rays that have a second wavelength range. The sub-color filter R for red color can be formed using either of the methods described above. In addition, other sub-color filters, for example, green color and blue color, can be formed through the same process as that of the sub-color filter R. The cholesteric liquid crystal (CLC) color filter 38 can be manufactured by repeating the above-described process for each sub-color-filter R, G, and B. Finally, a passivation layer 42 is formed on the cholesteric liquid crystal (CLC) color filter 38.

If the helical structure of the sub-color filter R is left-handed, the left circular polarization component of the incident light that is in the wavelength range of the red color is reflected, and other components of the incident light transmits the cholesteric liquid crystal (CLC) color filter and then are absorbed to the absorption layer. Accordingly, an observer can see the red color.

SUMMARY OF THE INVENTION

The present invention is directed to a cholesteric liquid crystal (CLC) color filter and a method of manufacturing the cholesteric liquid crystal (CLC) color filters that substantially obviates one or more problems due to limitations and disadvantages of the related art.

An advantage of the present invention is to provide a cholesteric liquid crystal (CLC) color filter substrate that has black matrices on the boundaries of each of the sub-color filters to improve the contrast ratio of a liquid crystal display device.

Another advantage of the present invention is to provide a cholesteric liquid crystal color filter substrate wherein boundaries of each of the sub-color filters is substituted for black matrices such that the boundaries reflect incident light having a long wavelength and thereby function as a black matrix.

Another advantage of the present invention is to provide a manufacturing method of a cholesteric liquid crystal (CLC) color filter substrate that has black matrices on boundaries of each of the sub-color filters to improve contrast ratio of a liquid crystal display device.

Another advantage of the present invention is to provide a manufacturing method of a cholesteric liquid crystal (CLC) color filter substrate wherein boundaries of each of the sub-color filters is substituted for black matrices such that the boundaries reflect incident light having a long wavelength and function as a black matrix.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention as embodied and broadly described, a cholesteric liquid crystal (CLC) color filter substrate for reflective liquid crystal display devices comprises an alignment layer on a black substrate, a cholesteric liquid crystal (CLC) color filter on the alignment layer, the cholesteric liquid crystal (CLC) color filter including sub-color-filters R, G and B, and black matrices on boundaries of each of the sub-color filters. The cholesteric liquid crystal (CLC) color filter substrate may further comprise an absorption layer on the black substrate for absorbing incident light. The absorption layer may be formed using a black resin. The black matrices may be formed using photosensitive black resin. The cholesteric liquid crystal (CLC) color filter substrate may further comprise a passivation layer using organic insulating material. The black substrate may be formed using metal ions that absorb all incident lights having a wavelength range of a visible ray.

In another aspect, a cholesteric liquid crystal (CLC) color filter substrate for the reflective liquid crystal display (LCD) devices comprises an alignment layer on a black substrate, a cholesteric liquid crystal (CLC) color filter on the alignment layer, the cholesteric liquid crystal (CLC) color filter including sub-color-filters red (R), green (G), and blue (B), and boundaries of each of the sub-color filters that reflect incident light having a long wavelength. The long wavelength of the incident light is above a wavelength range of an infrared ray. The cholesteric liquid crystal (CLC) color filter substrate may further comprise an absorption layer on the black substrate for absorbing the incident light. The absorption layer may be formed using a black resin. The cholesteric liquid crystal (CLC) color filter substrate may further comprise a passivation layer using organic insulating material. The black substrate may be formed using metal ions that absorb all incident light having a wavelength range of a visible ray.

In another aspect, a manufacturing method of a cholesteric liquid crystal (CLC) color filter substrate for the reflective liquid crystal display (LCD) devices comprises the steps of forming an alignment layer on a black substrate, forming a cholesteric liquid crystal (CLC) color filter on the alignment layer, the cholesteric liquid crystal (CLC) color filter including sub-color-filters R, G and B, and forming black matrices on boundaries of each of the sub-color filters. The cholesteric liquid crystal (CLC) color filter substrate may further comprise an absorption layer on the black substrate for absorbing incident light. The absorption layer may be formed using a black resin. The black matrices may be formed using photosensitive black resin. The cholesteric liquid crystal (CLC) color filter substrate may further comprise a passivation layer using organic insulating material. The black substrate may be formed using metal ions that absorb all incident lights having a wavelength range of a visible ray.

In another aspect, a manufacturing method of a cholesteric liquid crystal (CLC) color filter substrate for the reflective liquid crystal display (LCD) devices comprises the steps of forming an alignment layer on a black substrate, forming a cholesteric liquid crystal (CLC) color filter on the alignment layer, the cholesteric liquid crystal (CLC) color filter including sub-color-filters R, G, and B, and forming boundaries of each of the sub-color filters that reflect incident light having a long wavelength. The long wavelength of the incident light is above a wavelength range of an infrared ray. The cholesteric liquid crystal (CLC) color filter substrate may further comprise an absorption layer on the black substrate for absorbing incident light. The absorption layer may be formed using a black resin. The cholesteric liquid crystal (CLC) color filter substrate may further comprise a passivation layer using organic insulating material. The black substrate may be formed using metal ions that absorb all incident light having a wavelength range of a visible ray.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE ILLUSTRATED EMBODIMENTS

Reference will now be made in detail to the illustrated embodiment of the present invention, which is illustrated in the accompanying drawings.

Figure 1:
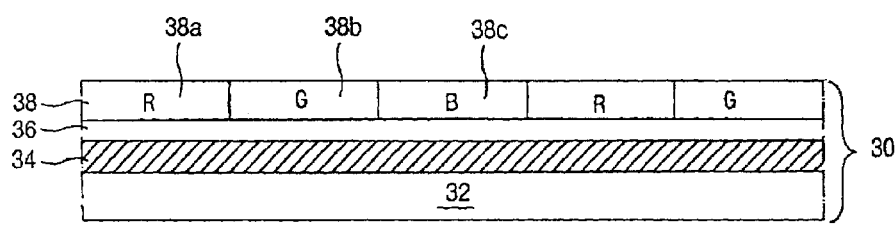
FIG. 1 is a cross-sectional view of a conventional cholesteric liquid crystal (CLC) color filter substrate.
Figure 2A:
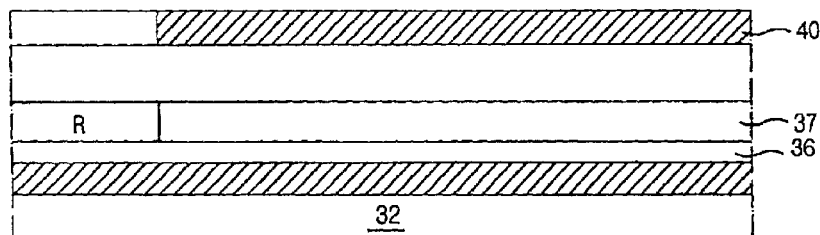
FIGS. 2A to 2B are cross-sectional views illustrating a fabrication process of the cholesteric liquid crystal (CLC) color filter substrate according to the related art.
Figure 2B:
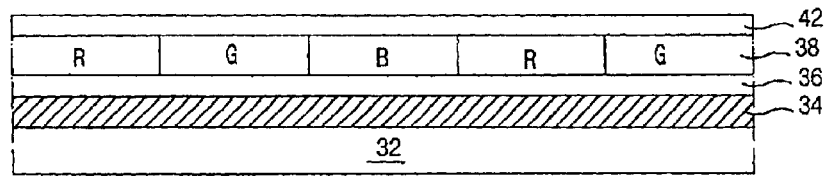
Figure 3A:
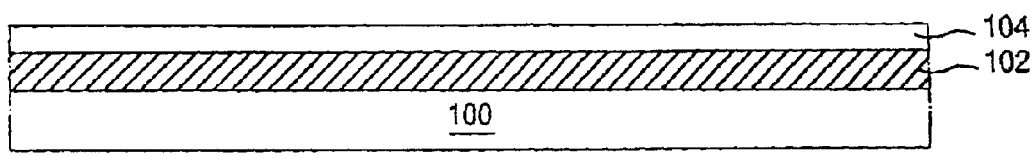
FIGS. 3A to 3C are cross-sectional views illustrating a fabrication process of the cholesteric liquid crystal (CLC) color filter substrate according to a first embodiment of the present invention.

A first embodiment of the present invention suggests a cholesteric liquid crystal (CLC) color filter substrate for a reflective liquid crystal display device and a method of making the same, wherein black matrices are independently formed on boundaries of each of the sub-color filters. In FIG. 3A, an absorption layer 102 is formed by coating a black resin on a substrate 100 and an alignment layer 104 is subsequently formed using polyimide-base resin.

Figure 3B:

In FIG. 3B, a cholesteric liquid crystal (CLC) layer 106 is then formed by coating a mixture of a cholesteric liquid crystal (CLC) and a photosensitive material on the alignment layer 104. The pitch of the CLC helix may then be controlled by varying a temperature of the cholesteric liquid crystal (CLC) layer 106 or irradiating ultraviolet rays onto the cholesteric liquid crystal (CLC) layer 106, in order to make the cholesteric liquid crystal (CLC) reflect incident light that has a wavelength corresponding to a red color. Ultraviolet rays are subsequently irradiated to a sub-color filter region for red color, using a mask 108 positioned over the cholesteric liquid crystal (CLC) layer 106 in order to cure the cholesteric liquid crystal (CLC) that has a controlled pitch.

Figure 3C:
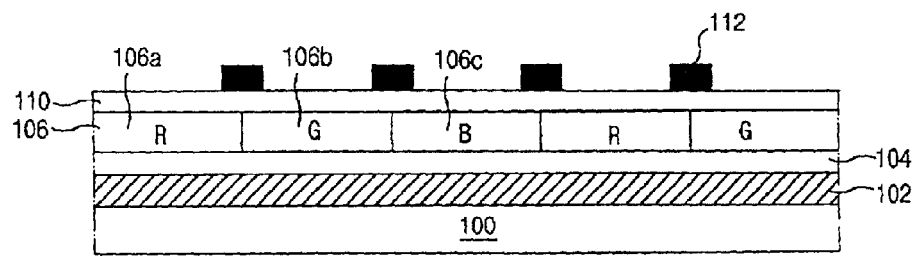

In FIG. 3C, the sub-color-filters R 106a, G 106b, and B 106c are formed on the substrate 100 by repeating the same process as that of the sub-color filter R 106a. A passivation layer 110 may be formed on the cholesteric liquid crystal (CLC) color filter 106 using an organic insulating material. Black matrices 112 are formed on the passivation layer 110 by coating a photosensitive black resin and then making the photosensitive black resin undergo processes such as a light exposure, a development and a patterning in sequence. The patterned black matrices 112 are formed on boundaries of each of the sub-color filters R 106a, G 106b, and B 106c. Because there exists no black matrix on the cholesteric liquid crystal (CLC) color filter according to the related art, two colors of the sub-color filters are mixed in the boundaries of each of sub-color filters, thereby making the displayed images not clear or blurry. According to the present invention, however, black matrices 112 can prevent the mixture of two colors in the boundaries regions of the sub-color filters, thereby clearer images can be displayed.

Figure 4:
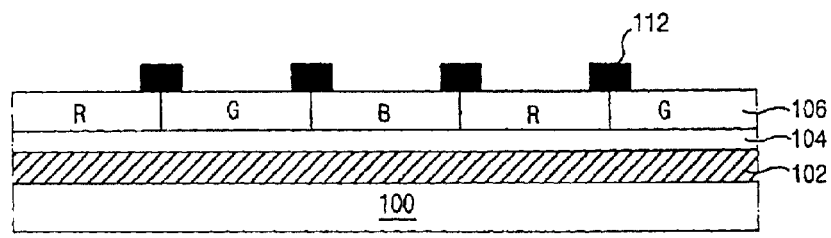
FIG. 4 is a cross-sectional view of a modified example of the first embodiment of the present invention.

FIG. 4 is a cross-sectional view of a modified example of the first embodiment of the present invention. As shown in FIG. 4, the black matrices 112 may be formed directly on the cholesteric liquid crystal (CLC) color filters 106 without forming the passivation layer 110 of FIG. 3C.

Figure 5A:
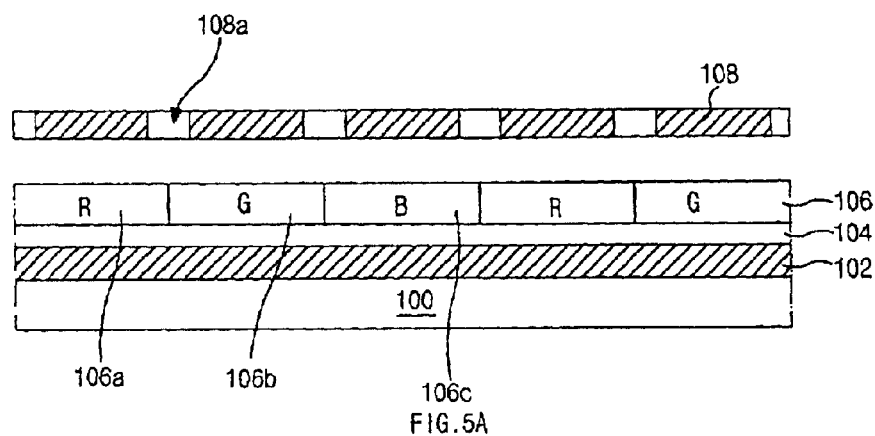
FIGS. 5A to 5B are cross-sectional views illustrating a fabrication process of the cholesteric liquid crystal (CLC) color filter substrate according to a second embodiment of the present invention.

A second embodiment of the present invention will be described hereinafter with reference to FIGS. 5A to 5B. The second embodiment provides a cholesteric liquid crystal (CLC) color filter, wherein a black matrix is not formed. Instead, boundaries of each of the sub-color filters are processed to function as the black matrix. In FIG. 5A, an absorption layer 102 is formed on a substrate 100 and an alignment layer 104 is formed on the absorption layer 102. A cholesteric liquid crystal (CLC) layer 106 is formed on the alignment layer 104. The forming processes for the absorption layer 102, the alignment layer 104, and the cholesteric liquid crystal (CLC) layer are the same as those characterized in the first embodiment of the present invention. After forming the cholesteric liquid crystal (CLC) layer 106 on the alignment layer 104, ultraviolet rays are irradiated through open portions 108a of a mask 108 positioned over the cholesteric liquid crystal (CLC) color filter 106. Accordingly, boundaries of each of the sub-color filters 106a, 106b, and 106c are exposed to the ultraviolet rays and thereby the boundaries of each of the sub-color filters can reflect only incident lights having a long wavelength.

Figure 5B:
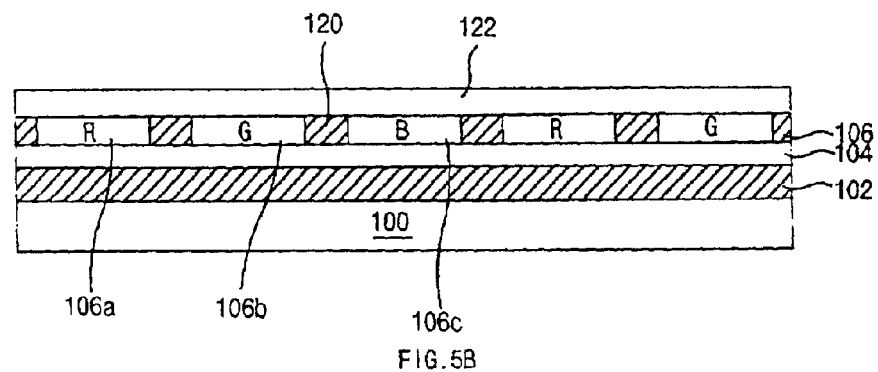

In FIG. 5B, because the boundaries 120 of each of the sub-color filters 106a, 106b, and 106c reflect wavelengths in a wavelength region of an infrared ray that are invisible. Therefore, the boundaries 120 of each of the sub-color filters 106a, 106b and 106c are displayed as black when observed. Accordingly, the boundaries of each of the sub-color filters function as the black matrix. A passivation layer 122 may be formed on the cholesteric liquid crystal (CLC) color filter 106 by coating a transparent organic resin.

The substrate of the first and second embodiments of the present invention may be selected from a transparent substrate or a black substrate that includes metal ions that absorb all incident rays having wavelengths in the visible spectrum. If the black substrate that includes the metal ions is used for the substrate, the absorption layer may not be formed on the substrate. Though it is not shown in the figure, a reflective color liquid crystal display device can be manufactured by assembling the cholesteric liquid crystal (CLC) color filter substrate and an array substrate and thereafter injecting the cholesteric liquid crystal (CLC) into a gap between the cholesteric liquid crystal (CLC) color filter substrate and the array substrate.

It will be apparent to those skilled in the art that various modifications and variations can be made in the fabrication and application of the present invention without departing from the spirit or scope of the invention. Thus, it is intended that the present invention cover modifications and variations of this invention provided they come within the scope of the appended claims and their equivalents.

What is claimed is:

1. A cholesteric liquid crystal (CLC) color filter substrate for reflective liquid crystal display devices, comprising:
   an alignment layer on a black substrate;
   a cholesteric liquid crystal (CLC) color filter on the alignment layer, the cholesteric liquid crystal (CLC) color filter including sub-color-filters red (R), green (G), and blue (B); and
   black matrices on boundaries between each of the sub-color filters R, G, and B.

2. The cholesteric liquid crystal (CLC) color filter substrate according to claim 1, further comprising an absorption layer on the black substrate.

3. The cholesteric liquid crystal (CLC) color filter substrate according to claim 2, wherein the absorption layer may be formed using a black resin.

4. The cholesteric liquid crystal (CLC) color filter substrate according to claim 1, wherein the black matrices may be formed using photosensitive black resin.

5. The cholesteric liquid crystal (CLC) color filter substrate according to claim 1, further comprising a passivation layer using organic insulating material.

6. The cholesteric liquid crystal (CLC) color filter substrate according to claim 1, wherein the black substrate may be formed using metal ions that absorb all incident light having a wavelength in a visible spectrum range.

7. A manufacturing method of a cholesteric liquid crystal (CLC) color filter substrate for reflective liquid crystal display devices, comprising:

forming an alignment layer on a black substrate;

forming a cholesteric liquid crystal (CLC) color filter on the alignment layer, the cholesteric liquid crystal (CLC) color filter including sub-color-filters red (R), green (G), and blue (B); and forming black matrices on boundaries of each of the sub-color filters R, G, and B.

8. The manufacturing method of a cholesteric liquid crystal (CLC) color filter substrate according to claim 7, further comprising an absorption layer on the black substrate.

9. The manufacturing method of a cholesteric liquid crystal (CLC) color filter substrate according to claim 8, wherein the absorption layer may be formed using a black resin.

10. The manufacturing method of a cholesteric liquid crystal (CLC) color filter substrate according to claim 7, wherein the black matrices may be formed using photosensitive black resin.

11. The manufacturing method of a cholesteric liquid crystal (CLC) color filter substrate according to claim 7, further comprising a passivation layer using organic insulating material.

12. The manufacturing method of a cholesteric liquid crystal (CLC) color filter substrate according to claim 7, the black substrate may be formed using metal ions that absorb all incident lights having a wavelength in a visible spectrum range.

* * * * *